United States Patent [19]

Daw et al.

[11] Patent Number: 5,435,972
[45] Date of Patent: Jul. 25, 1995

[54] FLUIDIZATION QUALITY ANALYZER FOR FLUIDIZED BEDS

[75] Inventors: C. Stuart Daw, Knoxville; James A. Hawk, Oak Ridge, both of Tenn.

[73] Assignee: The United States of America as represented by the United States Department of Energy, Washington, D.C.

[21] Appl. No.: 171,270

[22] Filed: Dec. 21, 1993

Related U.S. Application Data

[63] Continuation of Ser. No. 964,830, Oct. 22, 1992, abandoned.

[51] Int. Cl.⁶ .............................................. G05D 7/00
[52] U.S. Cl. .................................... 422/108; 422/62; 422/110; 422/112; 422/119; 422/139; 436/34
[58] Field of Search .......... 422/62, 139, 108, 110–112, 422/119; 436/34

[56] References Cited

U.S. PATENT DOCUMENTS

| | | | |
|---|---|---|---|
| 3,128,129 | 4/1964 | Stine et al. | 422/112 X |
| 3,164,440 | 1/1965 | Levey, Jr. | 423/259 |
| 3,467,502 | 9/1969 | Davis | 422/112 |
| 3,518,060 | 6/1970 | Delange et al. | 423/259 |
| 4,051,227 | 9/1977 | Heidt | 423/259 |
| 4,098,274 | 7/1978 | Ebling | 128/673 X |
| 4,226,798 | 10/1980 | Cowfer et al. | 260/465.3 |
| 4,336,227 | 6/1982 | Koyama et al. | 422/111 |
| 4,342,218 | 8/1982 | Fox | 128/673 X |
| 4,755,358 | 7/1988 | Voll et al. | 422/106 |
| 5,047,209 | 9/1991 | Lenczyk | 422/62 |
| 5,135,002 | 8/1992 | Kirchner | 128/672 |

FOREIGN PATENT DOCUMENTS

| | | |
|---|---|---|
| 3433302 | 3/1986 | Germany . |
| 0264337 | 2/1989 | Germany . |
| 446299 | 4/1975 | U.S.S.R. . |
| 0676315 | 7/1979 | U.S.S.R. . |
| 0679236 | 8/1979 | U.S.S.R. . |
| 0738653 | 6/1980 | U.S.S.R. . |

OTHER PUBLICATIONS

Levey et al., Fluid Bed Conversion of $UO_3$ to $UF_4$, Chemical Engineering Progress, vol. 56, No. 3, Mar. 1960.
S. Daw, Engineering Applications . . . Possibilities, Oak Ridge National Laboratory, Nov. 13, 1991.
C. S. Daw et al., Characterization of Voidage . . . Theory, ASME 1991.
Schouten et al, Chaotic Behavior . . . Reactor, Delft, Netherlands, ASME 1991.
J. Makansi; Fluidized-bed Boilers, Power, Mar. 1991.

Primary Examiner—Robert J. Warden
Assistant Examiner—Krisanne M. Thornton
Attorney, Agent, or Firm—David E. Breeden; Stephen D. Hamel; William R. Moser

[57] ABSTRACT

A control loop and fluidization quality analyzer for a fluidized bed utilizes time varying pressure drop measurements. A fast-response pressure transducer measures the overall bed pressure drop, or over some segment of the bed, and the pressure drop signal is processed to produce an output voltage which changes with the degree of fluidization turbulence.

13 Claims, 8 Drawing Sheets

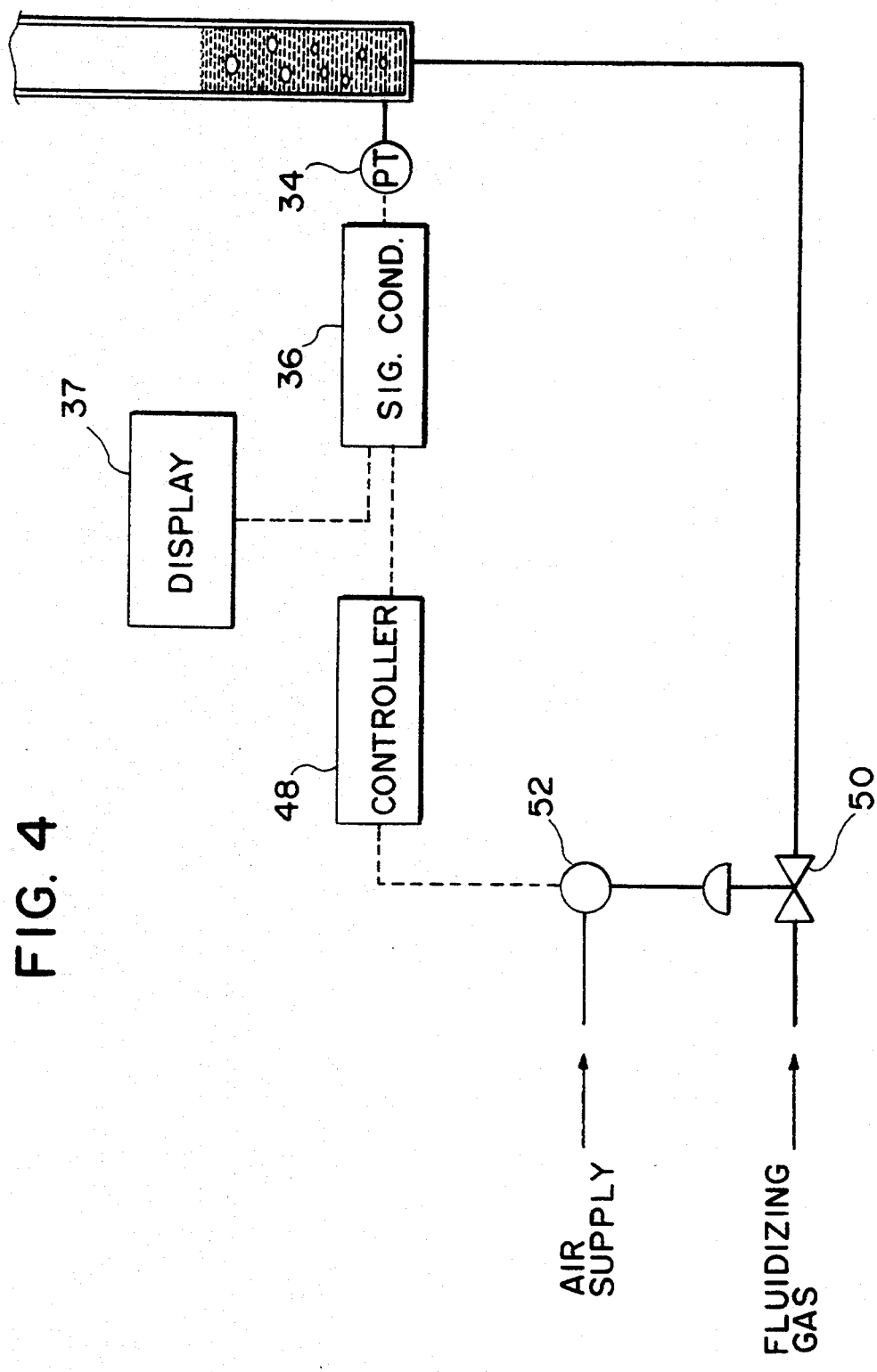

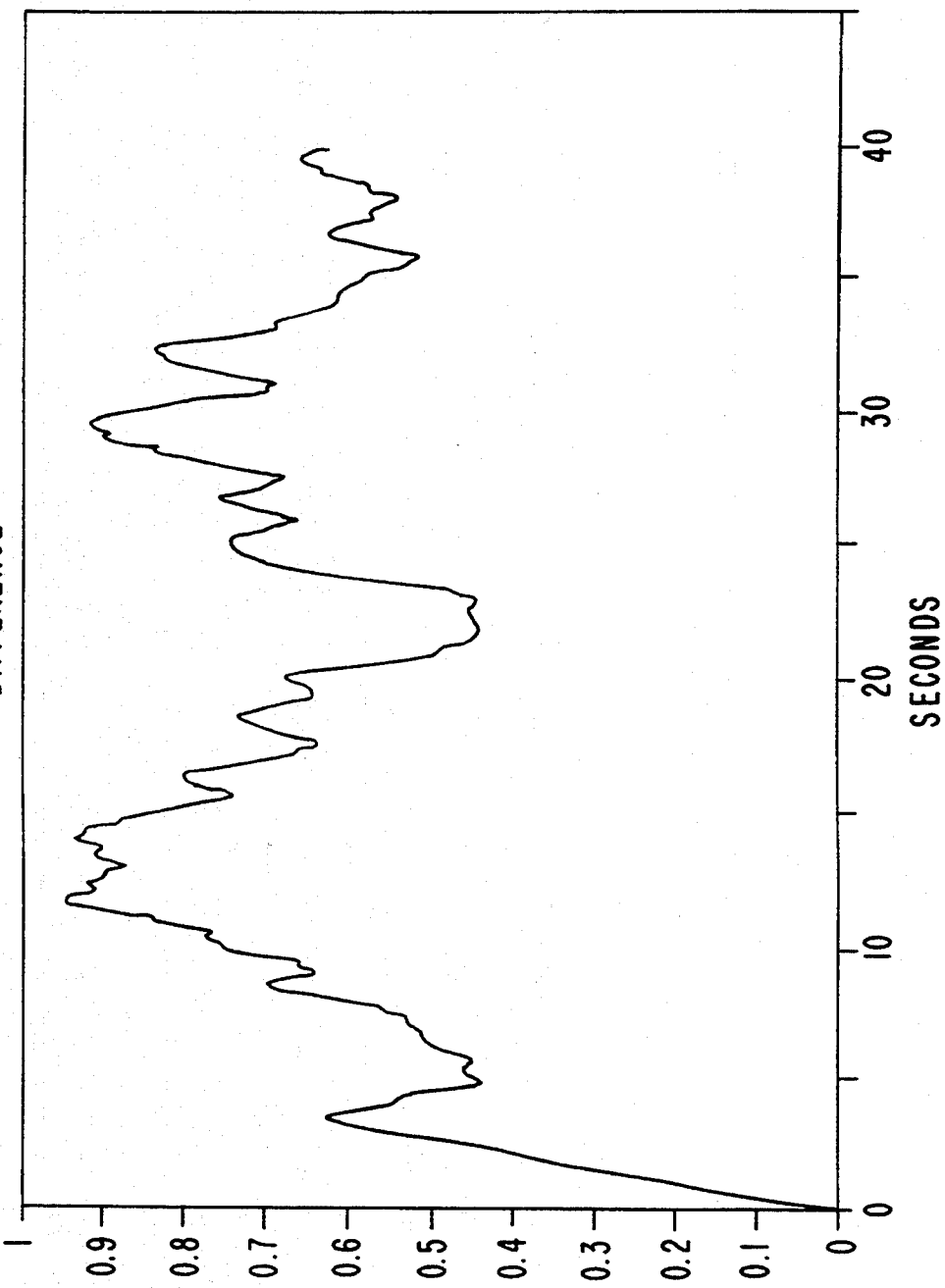

FLUIDIZATION QUALITY ANALYZER FOR FLUIDIZED BEDS

This invention was made with Government support under contract DE-AC05-84OR21400 awarded by the U.S. Department of Energy to Martin Marietta Energy Systems, Inc. and the Government has certain rights in this invention.

This is a continuation of application Ser. No. 07/964,830, filed on Oct. 22, 1992, now abandoned.

FIELD OF THE INVENTION

The present invention relates generally to fluidized bed reactors and, more specifically, to a fluidization quality analyzer which relies on time varying pressure drop measurements made in the fluidized bed of interest.

BACKGROUND OF THE INVENTION

Fluidized bed contactors are used in a wide variety of industries to promote chemical reaction and heat transfer between particulate solids and gases or liquids. Examples of specific applications are catalytic petroleum cracking, minerals beneficiation, flue gas cleanup, and metals transformation.

An example of the later is the production of $UF_4$ from $UO_3$, where particulate $UO_3$ is reacted in a first fluidized bed reactor with H2 to form $UO_2$, and then particulate $UO_2$ is reacted in a second fluidized bed reactor with HF to form $UF_4$.

Fluidization quality is an important concern in the operation of the above-described fluidized beds. The most desirable situation is to have relatively smooth bubbling, which promotes good gas-solids mass transfer while at the same time providing enough solids mixing to prevent large thermal gradients and agglomeration or sintering. When the bubbling is too quiescent (e.g., when the bed is at minimum fluidization), solids mixing may be insufficient to prevent agglomeration and mass-transfer may become rate limiting. Slugging, at the other extreme, produces rather poor gas-solids contacting and allows a large fraction of the inlet gas to pass through the bed unreacted. This condition is known as "bypassing". Moreover, slugging results in high solids entrainment rates.

Slugging has an adverse effect on process efficiency, in that it results in an excessive use of reactant gases and excessive carryover of solids to the fluidized bed reactor filters. In turn, these cause increased production of waste scrubber liquor and increased filter maintenance frequency. The later is of particular concern because it exposes personnel to radiation hazards. Also, slugging can lead to excessive use of HF reactant gas.

The most efficient contacting condition is that which produces sufficient agitation to prevent solids clumping while minimizing the degree of gas bypassing. Because it results in reduced bypassing, smooth bubbling is more desirable than slugging. The only other constraint is that the bubbling be of sufficient degree to provide adequate mixing.

For dense solids such as $UO_2$ and $UO_3$ smooth bubbling occurs over a relatively narrow range of gas flow, typically from just above the minimum fluidizing velocity to between 10 and 20% above it. Beyond this flow range the transition to slugging occurs rather abruptly. Predicting the precise gas flows where these dynamic transitions occur is difficult because of the variation in minimum fluidizing velocity with operating conditions (e.g., changes in bed temperature and particle size). Fluidization quality in the beds, based on the intensity of flow oscillations and the degree of gas-solids mixing, is of concern because of potentially adverse environmental, safety and health consequences.

Some variation in conditions is inevitable from batch to batch and during the treatment of each individual batch as the reactions release heat and particles shrink due to mechanical attrition. Thus, even if the gas flow is initially set at the correct value for a given batch, the bed is likely to drift away from the optimum fluidization state over the course of a run.

In the past, pressure measurements have been used to monitor conditions in fluidized beds. U.S. Pat. No. 4,336,227 to Koyama et al. discloses a fluidized bed reactor in which the pressure drop is measured. The ratio of two pressure drops is used to represent the ratio of the fluid velocity and minimum fluidizing velocity. The supply of fluidizing gas and particles are controlled based on pressure drop measurements.

U.S. Pat. No. 3,128,129 to Stine et al. discloses a system for controlling the circulation rate in a fluidized bed. Pressure differential measurement is used to control circulation and thus insure that the flow is in a desired direction.

U.S. Pat. No. 3,467,502 to Davis discloses a control system for carbon black reactors, in which pressure is measured upstream and downstream of an effluent forming area. A shut-off valve is operated in response to the measured pressure, thus providing a control loop.

U.S. Pat. No. 4,226,798 to Cowfer et al. discloses a control system for a fluidized bed reactor, in which a change in pressure drop is measured.

U.S. Pat. No. 3,164,440 discloses a fluidized bed reactor where pressure across the bed is monitored during the fluidization of $UF_4$ particles.

U.S. Pat. No. 5,047,209 to Lenczyk discloses a control system which relies on measured temperature fluctuations. The standard deviation of temperature at predetermined intervals of time is computed as part of the control process.

None of the above-noted U.S. patents would appear to provide an improved fluidization quality for fluidized beds prone to slugging based on determining fluidization quality and making corrective measures based on the determined quality.

SUMMARY OF THE INVENTION

An object of the present invention is to provide an improved apparatus for determining and maintaining fluidization quality in a fluidized bed reactor.

Another object of the present invention is to provide a control loop for a fluidized bed reactor which is capable of measuring pressure drop across the bed and providing a controlled rate of fluidizing gas flow based on the rate of change of the pressure drop, corresponding to the degree of fluidization turbulence.

These and other objects of the invention are met by providing a fluidization quality analyzer for a fluidized bed which includes means for generating a signal indicative of a pressure drop across at least a segment of the fluidized bed, signal processing means for processing the pressure drop signal to produce a final output signal which is proportional to variability in the pressure drop signal, and means for displaying the processed signal.

Another aspect of the present invention is to control the flow rate of fluidizing gas based on the processed signal noted above.

Other objects, advantages and salient features of the invention will become apparent from the following detailed description, which taken in conjunction with the annexed drawings, discloses preferred embodiments of the invention.

BRIEF DESCRIPTION OF THE DRAWINGS

FIG. 4 is a schematic view of a control loop and signal flow diagram according to the present invention;

FIG. 8 is a time sequence plot of an output signal conditioned according to the circuit of FIG. 3, using 18 to 40 mesh stainless steel with 4.0 ft/s superficial air velocity.

DETAILED DESCRIPTION OF THE INVENTION

Figure 1:
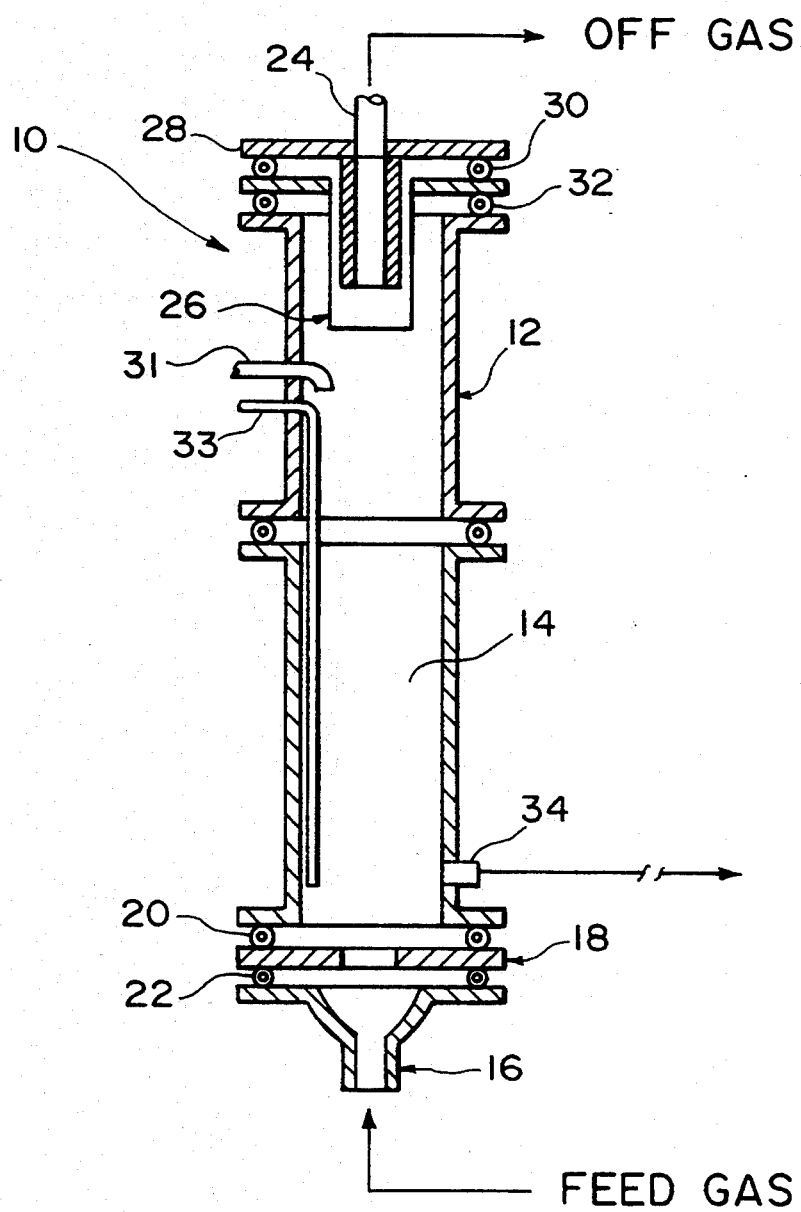
FIG. 1 is side-elevational view of a first preferred embodiment of a gas-solids contacting device according to the present invention.
Figure 2:
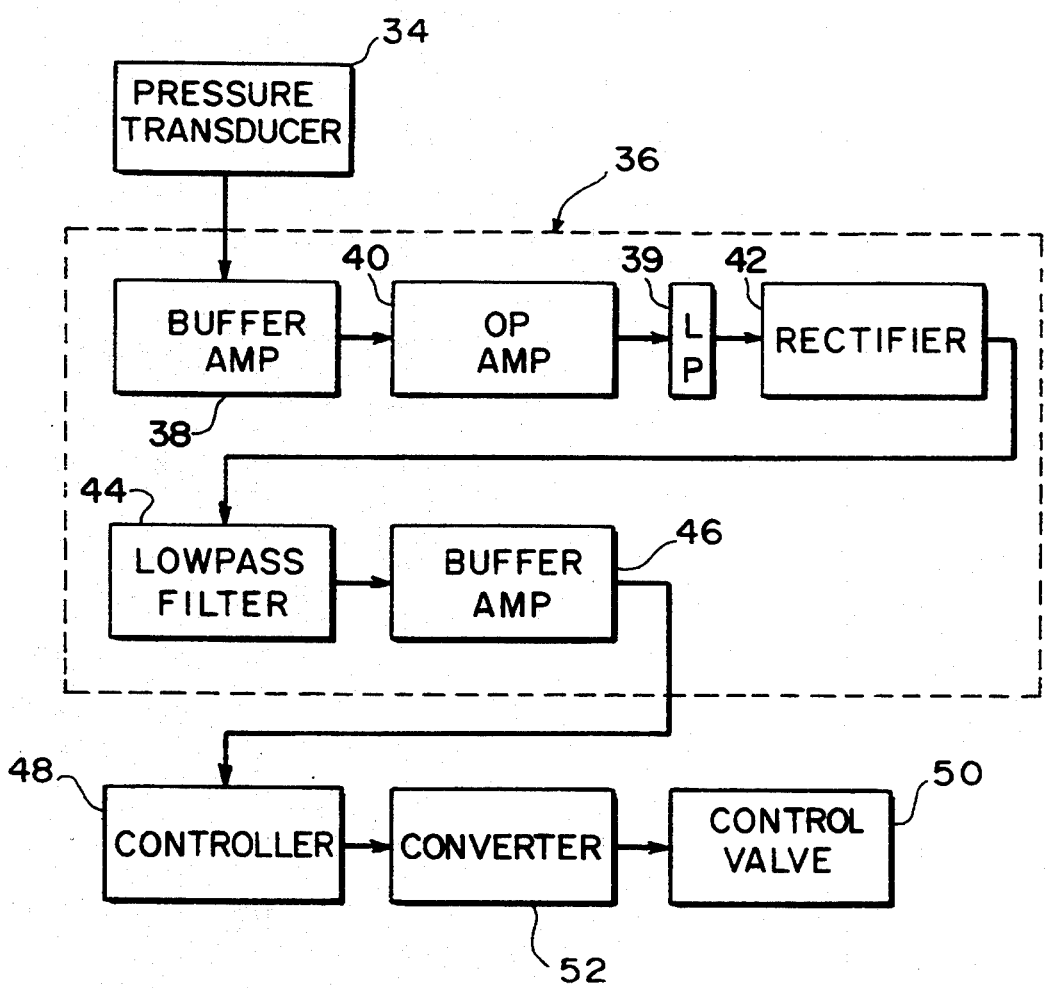
FIG. 2 is a schematic block diagram of a control system according to a preferred embodiment of the present invention.
Figure 3:
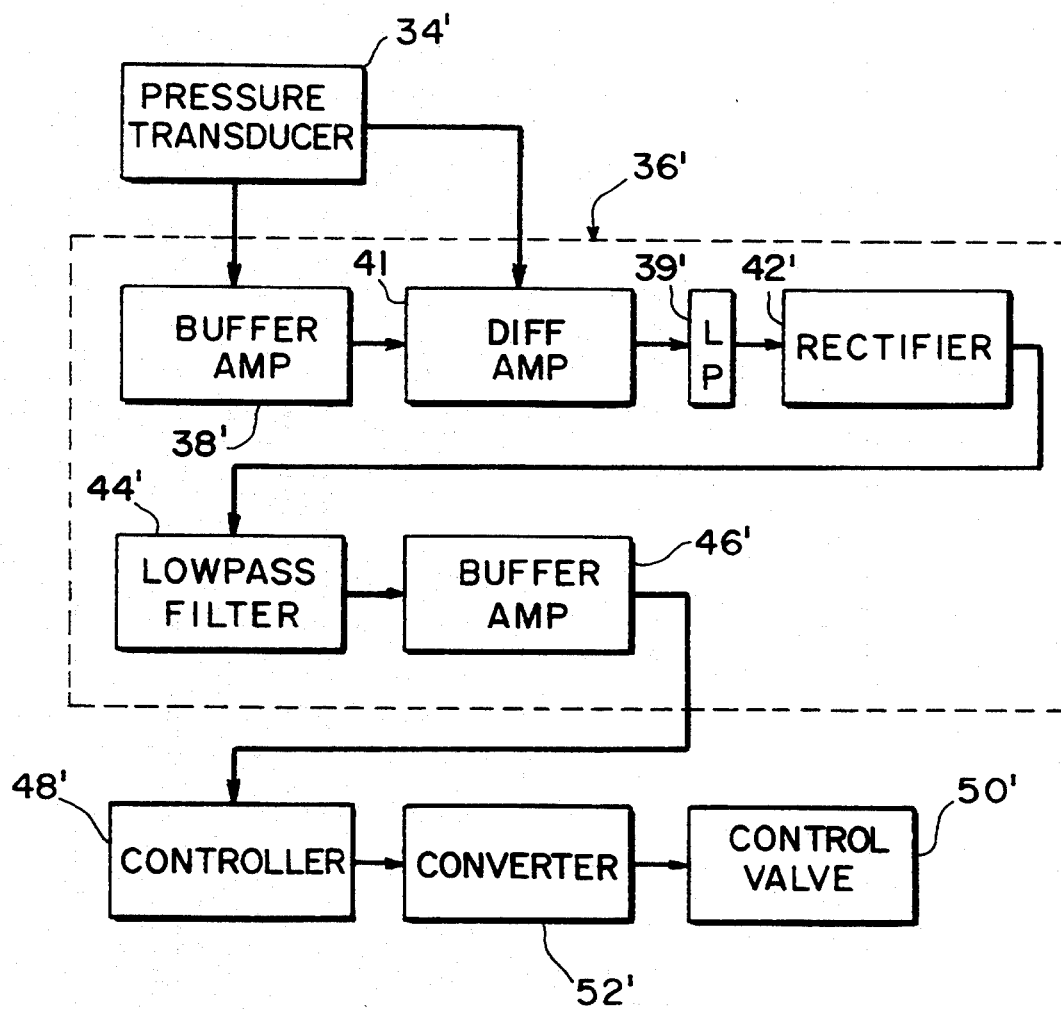
FIG. 3 is a schematic block diagram of a second embodiment of the present invention.

Referring now to FIGS. 1–3, a fluidized bed reactor 10 includes a housing 12 which defines an interior chamber 14. Feed gas enters the chamber 14 through an inlet 16 located at the bottom of the housing 12. A gas distribution plate 18 properly distributes the feed gas in the chamber 14, and is held between two Inconel "O" rings 20 and 22. Off gas is removed through an outlet 24 disposed at the top of the housing 12, after passing through a porous metal filter 26. A cover 28 and the metal filter 26 are positioned by two Inconel "O" rings 30 and 32. A solids fill pipe 31 and emptying pipe 33 are provided to supply and remove solids from the chamber 14. These details of the fluidized bed are illustrative, and not intended to be limiting.

A pressure transducer 34, disposed immediately above the gas distribution plate 18, produces an electrical signal indicative of the pressure drop across the fluidized bed reactor 10. The pressure transducer 34 is mounted in a pressure tap or bore in the sidewall of the housing 12, preferably flush with the interior surface of the chamber 14. The pressure transducer measures the overall pressure drop between the distributor plate 18 and the outlet 24 (at atmospheric pressure). Commercially available pressure transducers include a Schaevitz model P1041-0005, which has a built-in amplifier, a pressure range of 0–75 psig, and a frequency response of 0–1000 Hz (although preferably the transducer is a "fast-response" pressure transducer having a response frequency greater than 30 Hz and a pressure range of 0–10 psig). The location of the transducer must be sufficient to allow measurement of the overall bed pressure drop or the pressure drop over some segment of the bed which is always below the bed surface.

The signal of the pressure transducer 34 is processed as shown in FIG. 2. Basically, the electronic signal produced by the pressure transducer 34 is processed with an analog circuit contained in a module 36 to produce an output voltage that changes with the degree of fluidization turbulence. The output voltage can be used directly as an indicator of fluidization quality and/or to stimulate some control action, such as the increasing or decreasing of the fluidization flow through control of a control valve.

The embodiment of FIG. 2 involves direct differentiation of the original signal. In order to convert the fluctuating pressure measurements into a practical control signal, the analog circuit provides the first derivative of the original signal. This is accomplished with the following functional blocks: a buffer amplifier 38, which is not essential, but provides isolation between the pressure transducer and the rest of the circuit; a differentiator 40 which differentiates the pressure signal; a low-pass filter (LP) 39 which reduces the effects of noise in the original pressure signal and the inherent noisiness in evaluating a derivative; a rectifier 42 which produces a continuously positive output, consistent with the positive nature of the standard deviation; a second low-pass filter 44 which further smoothes the inherently variable pressure signal; and a second buffer amplifier 46, which again is not essential, but conditions the signal to be compatible with the input to the controller 48. The controller 48, which can be either digital or analog, compares a setpoint and the process signal and outputs a control signal based on the difference between the two. A control signal issuing from the controller 48 as a result of this comparison is in effect a corrective signal used to actuate a control valve 50 through an converter 52.

An alternative embodiment is illustrated in FIG. 3, in which most of the same components are used as in the FIG. 2 embodiment. These components are designated by the same, but primed, reference numerals. Instead of using direct differentiation of the original signal with an operational amplifier 40, the embodiment of FIG. 3 involves differencing the original signal with itself using a differential amplifier (diff amp) 41 after low-pass filtering. In either case, the intermediate signals are subsequently low-pass filtered and rectified to produce a final output that is proportional to variability in the original signal.

A further embodiment of the present invention involves substituting a high-pass filter for the operational amplifier/differentiator of the previous embodiments. The breakpoint of the high-pass filter should be chosen to be well below that of the first low-pass filter (e.g., 1 Hz and 20 Hz). The effect of the high-pass filter in this case is similar to that of the differentiator.

OPERATION OF CONTROL LOOP

Tests have been conducted employing the techniques and devices of the present invention using air as the fluidizing gas. A test bed was constructed as a 1:1 scale mockup of the Y-12 beds at the Oak Ridge National Laboratory, U.S. Department of Energy, in Oak Ridge, Tenn. The bed included a 1.2° included-angle taper, a conical inlet section, four bubble-cap inlet air nozzles, and a ¾ inch diameter solids transfer pipe (referred to hereinafter as the downcomer). A pressure tap was provided at the bottom of the bed and connected to a Schaevitz model P1041-0005 pressure transducer. This provided a measurement of the overall pressure drop from the tap to atmosphere. In the tests, 316 stainless steel was used as a surrogate for particulate $UO_2$, $UO_3$, and $UF_4$.

FIG. 4 illustrates schematically a control loop according to the present invention in which the signal generated by the pressure transducer (pt) 34 is received and processed by the signal conditioner module 36, and subsequently fed to the controller 48. Based on a comparison made in the controller 48, a control signal is delivered to the converter 52. The converter 52 converts the current input signal to pressure, so that the air supply is regulated to the air-actuated fluidizing gas control valve 50.

The controller 48 was a Foxboro model 760 operating in simple PID mode with the control settings as follows: proportional factor =3500%, integral factor=0.02 min, and derivative valve was a Research Control Valve model SB75 with a "E" trim having a Cv of g 0.05. The air supply pressure to the control valve, if used, is typically set at 20 psig. In closed loop operation, the conditioned signal is fed to the controller 48 for determination of an error or deviation from a preset value. If one exists, the control valve or valves 50 are actuated accordingly to change the flow rate of the fluidizing gas. If the control loop is not used, in favor of manual correction, for example, the conditioned signal can be displayed with any suitable display device 37, such as an oscilloscope or voltmeter.

Figure 5A:
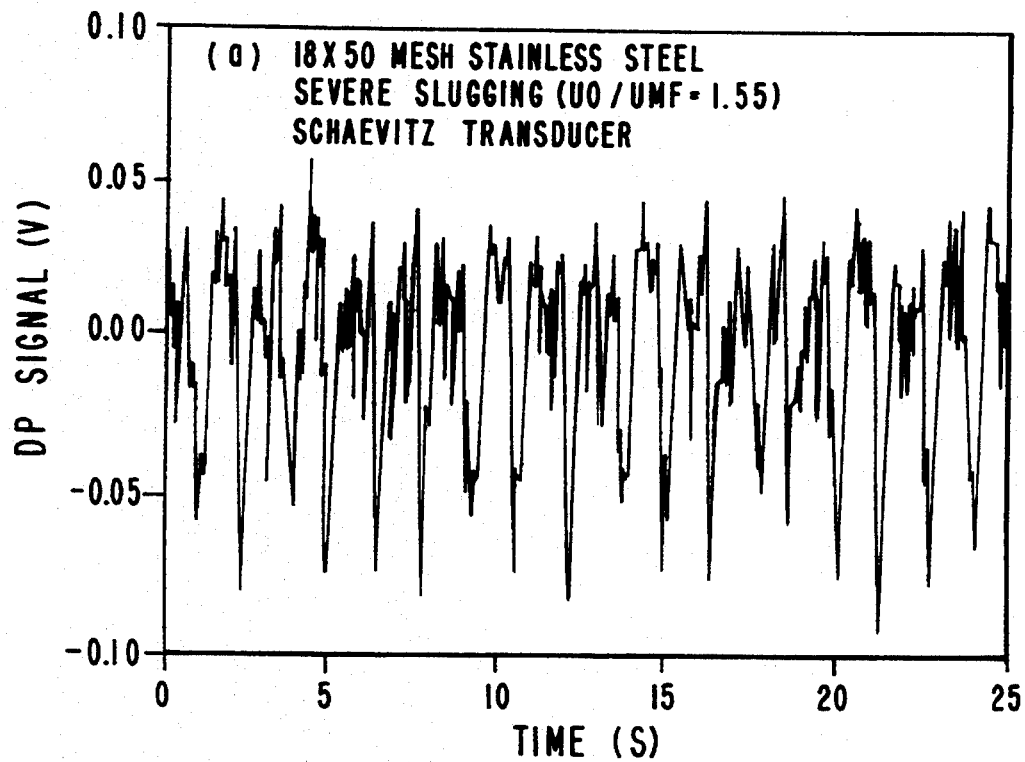
FIGS. 5(a) and 5(b) are signal traces of the pressure transducer in severe slugging and mildly slugging conditions, respectively.
Figure 5B:
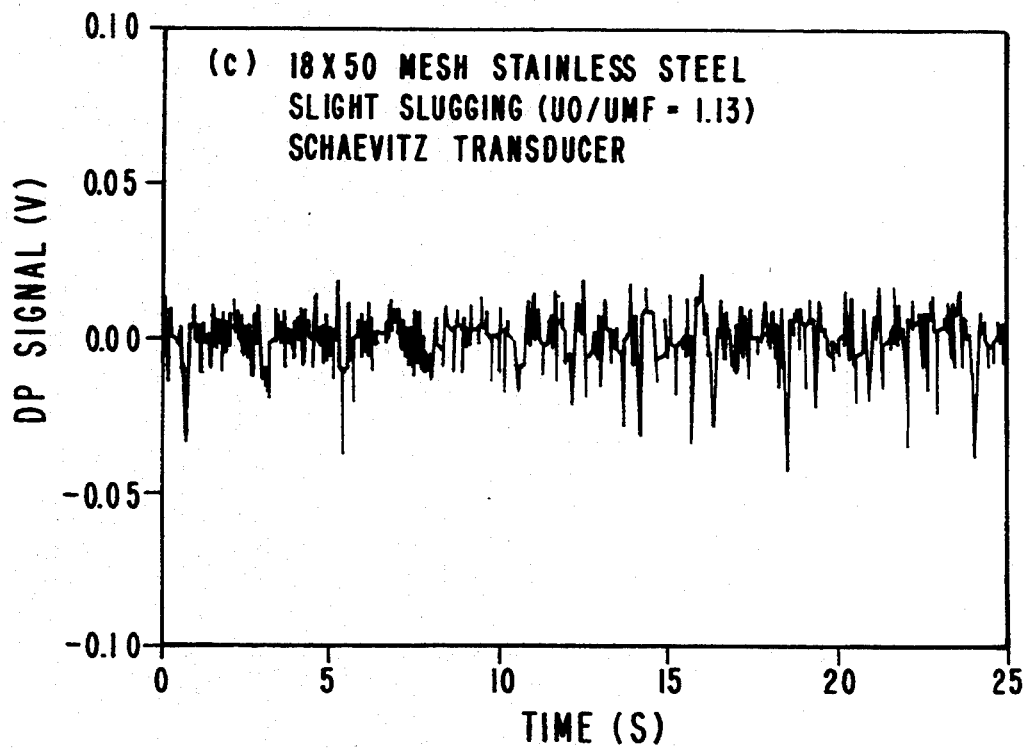

Test results confirmed that pressure-drop fluctuations provide a good indication of fluidization quality in the test bed. FIGS. 5(a) and 5(b) illustrate typical pressure drop signals from the pressure transducer for highly slugging conditions and slightly slugging conditions, respectively. As expected, the large bubbles and surging flow typical of heavy slugging tend to produce larger, faster pressure fluctuations. As slugging is reduced, flow surges subside and pressure fluctuations diminish.

Figure 6:
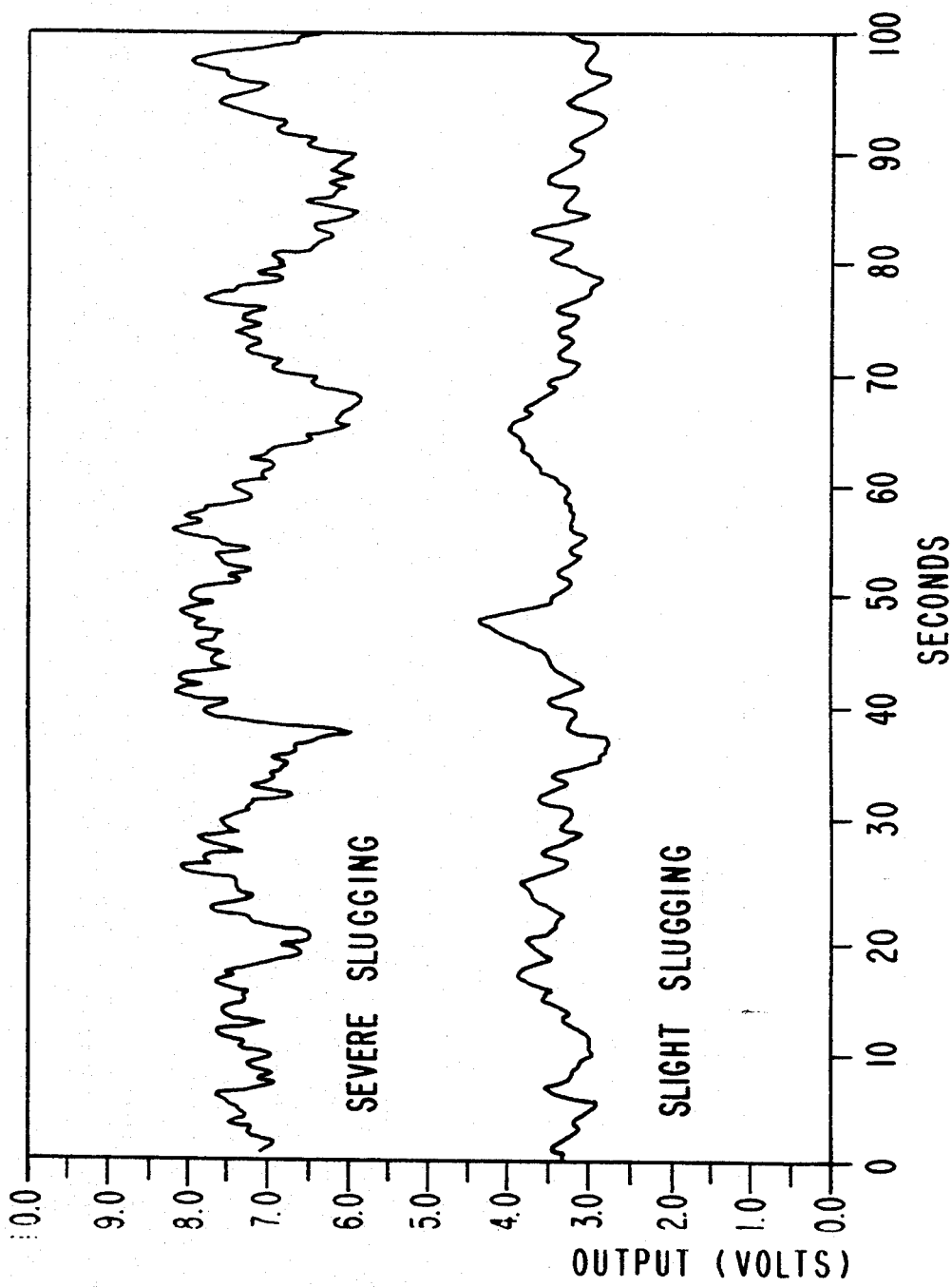
FIG. 6 is a graph showing conditioned signal traces according to the present invention.

The signal conditioning module 36 effectively averages the rate of pressure fluctuation to produce a fluidization intensity signal that can be used to establish whether or not the bed is operating at a target condition. Typical output using the signal conditioning of the present invention is illustrated in FIG. 6, which has two signal traces showing severe and slight slugging conditions. Increased fluidization intensity increases the magnitude of the conditioned pressure signal. Also, because of the chaotic nature of fluidization, the signal is not completely constant but wanders slightly about its long-term average. This wandering can be reduced by increasing the time constant of the filters in the module 36 (i.e., increasing the effective averaging time), but this is done at the expense of reduced response rate to changes in the bed. In general, the precise setting of the filters is a compromise between the need to maintain a constant signal for a given fluidization condition and the need to respond rapidly to changes in fluidization condition.

Figure 7:
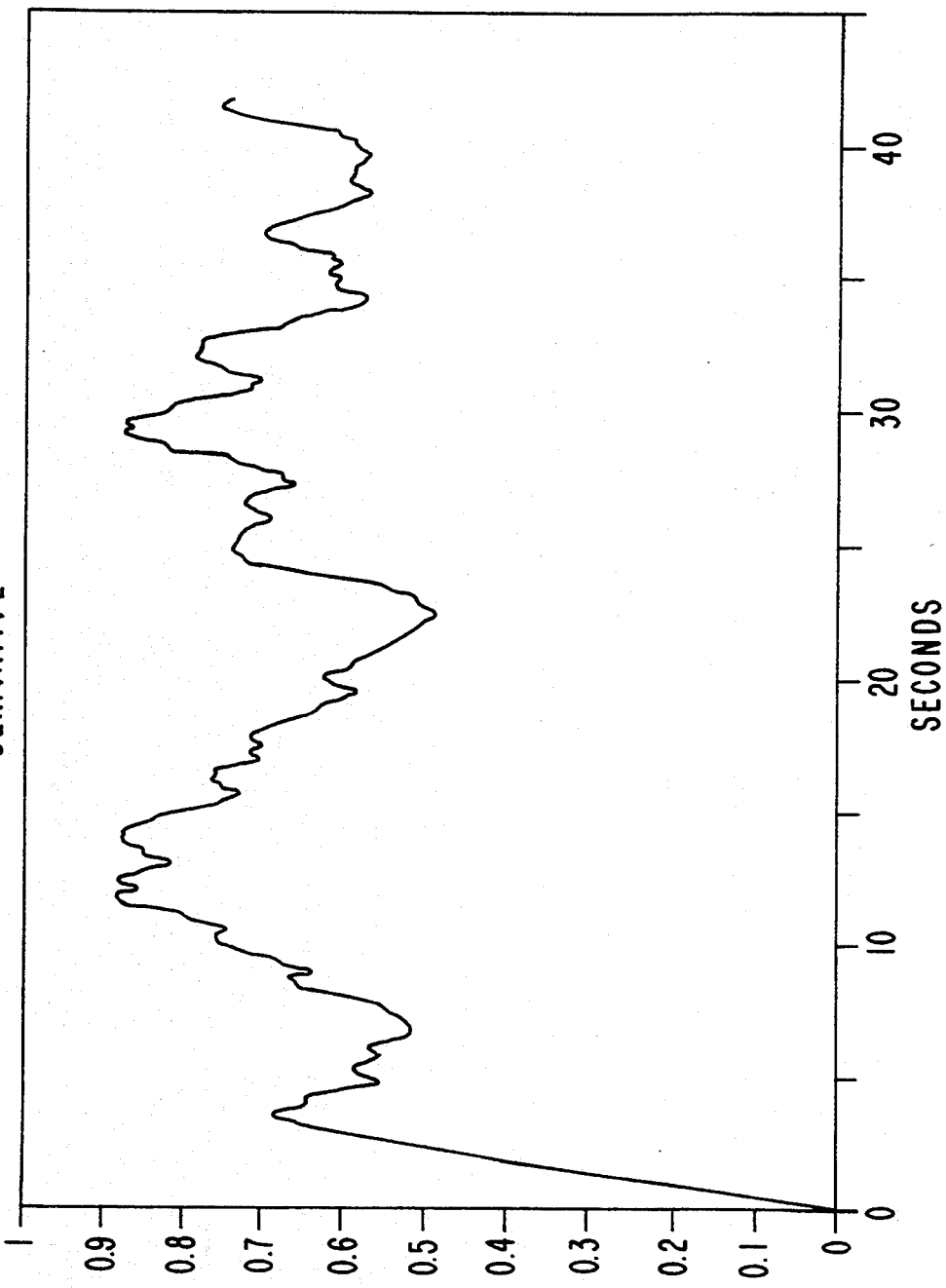
FIG. 7 is a time sequence plot of the filtered rectified derivative pressure signal conditioned according to the circuit of FIG. 2, using 18–40 mesh stainless steel with 4.0 ft/s superficial air velocity.

FIGS. 7 and 8 illustrate the appearance of experimental pressure drop data that has been converted to derivative and difference signals using the two circuit embodiments of FIGS. 2 and 3, respectively. In these cases, the low-pass filters used were set at 0.25 Hz. In spite of the severe filtering, the resulting signal still tends to wander slowly over time. The magnitude of this variation is small compared with the original signal.

The above establishes that fluctuations in fluidized bed pressure drop can be correlated directly with fluidization quality. Simple analog conditioning of the pressure signal provides an output which can be used for either monitoring or closed loop control. The signal conditioning of the present invention is based upon chaotic time series analysis, and is an advance over Fourier analysis methods. Although fluidized bed pressure signals are non-periodic, the present invention could also be used to process signals of a periodic nature as well. The present invention makes it possible for the first time to automatically control the degree of turbulence (fluidization quality) in a fluidized bed.

While advantageous embodiments have been chosen to illustrate the invention, it will be understood by those skilled in the art that various changes and modifications can be made therein without departing from the scope of the invention as defined in the appended claims.

What is claimed is:

1. A fluidization quality analyzer comprising:
   pressure transducer means for generating a signal indicative of pressure drop across at least a segment of a fluidized bed;
   wherein the pressure drop signal has a turbulence-induced, time-varying component which corresponds to bubble activity within the fluidized bed,
   signal processing means for separating the turbulence-induced, time-varying component from the pressure drop signal and producing therefrom an output signal in a time domain which is proportional to substantially instantaneous variability in the pressure drop signal; and
   means for displaying the output signal as an indication of bubble activity within the fluidized bed,
   wherein the pressure transducer means is a fast response pressure transducer having a frequency response greater than 30 Hz.

2. A fluidization quality analyzer according to claim 1, wherein the signal processing means comprises one of an analog circuit and a digital processor, either of which includes means for performing direct differentiation of the pressure drop signal.

3. A fluidization quality analyzer according to claim 1, wherein the signal processing means comprises one of an analog circuit and a digital processor, either of which includes means for differencing the pressure drop signal with a low pass filtered version of itself.

4. A fluidization quality analyzer according to claim 2, wherein the signal processing means includes means for producing a first derivative of the pressure drop signal, the first derivative being the final output signal.

5. A fluidization quality analyzer according to claim 4, wherein the signal processing means includes an operational amplifier, a low-pass filter, and a rectifier.

6. A fluidization quality analyzer according to claim 3, wherein the signal processing means comprises a differential amplifier having the pressure drop signal as a first input, and the low-pass filtered version of the pressure drop signal as a second input, and means for rectifying and low-pass filtering a signal corresponding to the difference between the first input and the second input.

7. A fluidization quality analyzer according to claim 1, wherein the display means is an oscilloscope.

8. A control loop for a fluidized bed, comprising:
   pressure transducer means for generating a signal indicative of a pressure drop across at least a segment of a fluidized bed;

wherein the pressure drop signal has a turbulence-induced, time-varying component which corresponds to bubble activity within the fluidized bed, signal processing means for separating the turbulence-induced, time-varying component from the pressure drop signal and producing therefrom an output signal in a time domain which is proportional to substantially instantaneous variability in the pressure drop signal;

a valve for controlling flow of fluidizing gas into the fluidized bed;

an actuator, operatively coupled to the valve, for moving the valve in accordance with a desired flow rate;

control means, receiving the output signal from the signal processing means, for comparing the output signal to a predetermined value corresponding to an optimal flow rate of fluidizing gas in the fluidized bed, and issuing a control signal to the actuator when the output signal is sufficiently different from the predetermined value, wherein the pressure transducer means is a fast response pressure transducer having a frequency response of at least 30 Hz.

9. A control loop according to claim 8, wherein the signal processing means comprises one of an analog circuit and a digital processor either of which includes means for performing direct differentiation of the pressure drop signal.

10. A control loop according to claim 8, wherein the signal processing means comprises one of an analog circuit and a digital processor either of which includes means for differencing the pressure drop signal with a low pass filtered version of itself.

11. A control loop according to claim 9, wherein the signal processing means includes means for producing a first derivative of the pressure drop signal, the first derivative being the final output signal.

12. A control loop according to claim 11, wherein the signal processing means includes an operational amplifier, a low-pass filter, and a rectifier.

13. A control loop according to claim 10, wherein the signal processing means comprises a differential amplifier having the pressure drop signal as a first input, and a low-pass filtered version of the pressure drop signal as a second input, and means for rectifying and low-pass filtering signal corresponding to the difference between the first input and the second input.

* * * * *